US012439443B2

(12) United States Patent
Mukherjee

(10) Patent No.: US 12,439,443 B2
(45) Date of Patent: Oct. 7, 2025

(54) CHANNEL MANAGEMENT AND SHARED USE OF WIRELESS SPECTRUM

(71) Applicant: Charter Communications Operating, LLC, St. Louis, MO (US)

(72) Inventor: Amitav Mukherjee, Elk Grove, CA (US)

(73) Assignee: Charter Communications Operating, LLC, St. Louis, MO (US)

(*) Notice: Subject to any disclaimer, the term of this patent is extended or adjusted under 35 U.S.C. 154(b) by 532 days.

(21) Appl. No.: 17/332,816

(22) Filed: May 27, 2021

(65) Prior Publication Data

US 2022/0386314 A1 Dec. 1, 2022

(51) Int. Cl.
*H04W 72/56* (2023.01)
*H04W 24/08* (2009.01)
*H04W 52/38* (2009.01)
*H04W 72/51* (2023.01)

(52) U.S. Cl.
CPC ........... *H04W 72/56* (2023.01); *H04W 24/08* (2013.01); *H04W 52/38* (2013.01); *H04W 72/51* (2023.01)

(58) Field of Classification Search
CPC ..... H04W 72/00; H04W 72/04; H04W 72/10; H04W 72/048; H04W 24/00; H04W 24/08; H04W 52/00; H04W 52/04; H04W 52/38; H04W 52/386
See application file for complete search history.

(56) References Cited

U.S. PATENT DOCUMENTS

| 2019/0115985 | A1* | 4/2019 | Bechta | H04L 5/0048 |
| 2019/0394790 | A1* | 12/2019 | Damnjanovic | H04L 27/0006 |
| 2020/0037320 | A1* | 1/2020 | Karimli | H04W 72/085 |
| 2020/0037321 | A1* | 1/2020 | Karimli | H04W 72/0453 |

(Continued)

OTHER PUBLICATIONS

3rd Generation Partnership Project; "Technical Specification Group Radio Access Network"; NR; Physical layer procedures for control (Release 16), 3GPP TS 38.213 V16.5.0 (Mar. 2021), pp. 1-183.

(Continued)

*Primary Examiner* — Robert C Scheibel
(74) *Attorney, Agent, or Firm* — Armis IP Law, LLC

(57) ABSTRACT

Communication management hardware controls operation of multiple wireless stations in a network environment. For example, the communication management hardware initially assigns wireless bandwidth for use by multiple wireless stations in a wireless network environment to communicate amongst each other. The communication management hardware monitors use of the wireless bandwidth. In response to detecting use of the wireless bandwidth by an incumbent entity having higher priority rights than the multiple wireless stations, the communication management hardware operates in a shared time-division mode in which both the multiple wireless stations and the incumbent entity share use of the wireless bandwidth in a control period according to a duty cycle in which the wireless stations are provided full use of the wireless bandwidth during a first portion of the control period and the wireless stations are provided reduced use of the wireless channels for a second portion of the control period.

39 Claims, 13 Drawing Sheets

(56) References Cited

U.S. PATENT DOCUMENTS

2021/0211889 A1* 7/2021 Buddhikot ............ H04W 48/04
2021/0389474 A1* 12/2021 Hamzeh ............. H04B 7/18517

OTHER PUBLICATIONS

5GHz RLAN; Harmonised Standard covering the essential requirements of article 3.2 of Directive 2014/53/EU, ETSI EN 301 893 V2.1.1, (May 2017), pp. 1-122.

Daley, et al., "Federal Radar Spectrum Requirements", U.S. Department of Commerce, National Telecommunications and Information Administration, NTIA Special Publication, May 2000, pp. 1-60.

Hale, et al, NIST Technical Note 1954, 3.5 GHz Radar Waveform Capture at Point Loma, Final Test Report, May 2017, pp. 1-97, https://doi.org/10.6028/NIST.TN.1954.

Wireless Innovation Forum CBRS Incumbent Protections and Encumbrances Overview, Document WINNF-TR-5003, V1.0.0. Apr. 28, 2020, pp. 1-67.

* cited by examiner

*ServingCellConfigCommonSIB* information element

```
-- ASN1START
-- TAG-SERVINGCELLCONFIGCOMMONSIB-START
ServingCellConfigCommonSIB ::=    SEQUENCE {
downlinkConfigCommon           DownlinkConfigCommonSIB,
...
dutycyclemode-r18        DutyCycleMode-r18    OPTIONAL  -- Need M
...
}
```
⌣ 910

FIG. 9

*DutyCycleMode* information element

```
-- ASN1START
-- TAG-DUTYCYCLEMODE-START
DutyCycleMode-r18 ::=    SEQUENCE {
ONPeriod .................................... ENUMERATED {ms20, ms50, ms100, ms400, ms1000, ms2000}
TimeDurationON............................ INTEGER(1..2047),
MeasureDL-OFFduration ................ BOOLEAN,
ss-PBCH-BlockPower-OFF ............ INTEGER (-90..30 dBm),
Srs-OFFduration ........................... BOOLEAN,
Srs-powerbackoff ......................... INTEGER (1..63)
}
-- TAG-DUTYCYCLEMODE-STOP
-- ASN1STOP
```

CHANNEL MANAGEMENT AND SHARED USE OF WIRELESS SPECTRUM

BACKGROUND

Conventional wireless networks include any of different types of communication devices supporting different wireless protocols. For example, two types of wireless networks support so-called LTE (Long Term Evolution) or NR (New Radio) communications in which user equipment is able to communicate with a base station (such an eNodeB, gNodeB, etc.) via use the LTE or NR protocol to access a respective network.

In certain instances, wireless stations such as those supporting LTE or NR share use of wireless spectrum with other entities. For example, the U.S. military/DoD (Department of Defense) and other federal agencies operate a broad swathe of land-based, sea-based, and airborne radar systems in the UHF (Ultra High Frequency) and SHF (Super High Frequency) bands between 300 MHz (MegaHertz) and 30 GHz (GigaHertz). Some of the frequency bands used to support military radar operations that also overlap with 5G NR bands are: 420-450 MHz, 902-928 MHz, 2900-3100 MHz, 3100-3650 MHz, and 5250-5900 MHz.

The CBRS band (3550-3700 MHz) considers military radar to be incumbent operations that are protected from interference due to mobile or fixed wireless PAL (Priority Access License) and GAA (General Authorized Access or lower-priority users) operations. So-called dynamic Protection Areas (DPAs) are defined areas in which the military may be operating systems that require protection from CBRS (Citizens Band Radio System) base station (such as a CBSD or Citizens Broadband Radio Service Device) emissions. The net effect is to introduce limits on how much aggregate in-band and out-of-band interference can be generated by CBSDs in the vicinity of DPAs.

If the DPA is not 'always ON', the detection of the presence of incumbent users is performed by Environmental Sensing Capability (ESC) sensors monitoring a respective region. Alternatively, an Incumbent-Informing Capability (IIC) may directly inform CBRS spectrum administrators about the planned use of shared spectrum. CBSDs with a large interference contribution to an activated DPA may have their spectrum grants suspended and be moved to another operating channel. The suspension of CBSDs continues until the protection threshold is met.

The primary federal incumbent in the 3.5 GHz band is the U.S. Navy shipborne SPN-43 air traffic control radar, as well as other DoD (Department of Defense) ground-based radar systems. Some information regarding military radar waveforms such as SPN-43 is available in the public domain. See NIST Technical Note 1954, 3.5 GHz Radar Waveform Capture at Point Loma, 2017.

In the government implemented RADAR (RAdio Detection And Ranging) systems, the so-called pulse repetition interval is the time interval between pulses and is the inverse of the pulse repetition frequency. The pulse duration is the duration of a single pulse. The antenna rotation period is the time interval between successive peaks of received power due to the rotation of the radar's transmitting antenna in the azimuth plane.

It is noted that an existing NR (New Radio) feature includes a semi-static channel access mode defined in Rel-16 for NR-Unlicensed operation in 5-7 GHz. For example, a gNB can initiate a transmission burst at fixed instances of time after a successful clear channel assessment (CCA). The duration of each burst with DL (DownLink) and UL (UpLink) transmissions is a COT (Channel Occupancy Time), which is followed by an Idle Period where transmissions are not allowed. The COT and Idle Period together comprise a Fixed Frame Period (FFP) that can be between 1 ms (millisecond) to 10 ms in duration, and the Idle Period is at least 5% of the Channel Occupancy Time, with a minimum of 100 μs (microsecond) duration. See ETSI EN 301 893 V2.1.1 (May 2017).

However, semi-static channel access was designed for isolated NR networks and is not suitable for radar coexistence since the CCA (Clear Channel Assessment) may fail due to radar signals and the COT is a continuous interval of regular-power transmissions without off periods of extended durations or pulse-level on-off switching.

BRIEF DESCRIPTION OF EMBODIMENTS

There are deficiencies associated with conventional techniques of providing wireless connectivity using CBRS channels. For example, the existing method of moving CBSDs to different wireless channels due to incumbent activity is disruptive for cellular wireless deployments. Moreover, imposing transmission power constraints on CBSDs to meet interference targets limits network coverage range.

Embodiments herein include an alternative approach to conventional allocation of wireless channels such as CBRS wireless channels subject to deallocation from a higher priority entity. For example, embodiments herein include transitioning to implementation of a duty cycle-based coexistence mode that allows sharing of spectrum by high priority users and low priority users without degrading RADAR performance implemented by the high priority users. This is technically challenging since a 5G NR radio access network with active user plane transmissions currently cannot operate in a duty cycle mode with alternating ON-OFF or ON-LOWPOWER states of differing durations, even though the number of always-ON transmissions is reduced compared to 4G LTE.

One approach herein assumes that ESC/IIC notifications initiate the duty cycle process via a spectrum administrator. Such an approach utilizes naval RADAR waveform parameters (e.g., rotation period, pulse duration and interval) that are readily available in the public domain, e.g., SPN-43, as a basis to control use of the wireless resources. These parameters may also be monitored by sensors implemented at one or more gNB.

In one embodiment, beamforming is not used for interference mitigation since the precise location of the RADAR system operated by the higher priority entity (such as incumbent user) is assumed to be classified. However, if the location or spatial direction is known, then existing NR beamforming mechanisms can be utilized for additional interference mitigation.

Accordingly, embodiments herein provide novel ways of improving coexistence of communication devices supporting different wireless communication protocols.

More specifically, a system includes communication management hardware that controls operation of multiple wireless stations in a network environment. For example, when bandwidth is not used by a respective higher priority entity, the communication management hardware initially assigns wireless bandwidth for use by multiple wireless stations in a wireless network environment to communicate amongst each other. The communication management hardware monitors use of the wireless bandwidth by one or more higher priority entities. In response to detecting use of the wireless bandwidth by an incumbent entity having higher priority rights than the multiple wireless stations, the communication management hardware operates in a shared mode in which both the multiple wireless stations and the incumbent entity share use of the wireless bandwidth in a control period according to a duty cycle.

In further example embodiments, even though the entity (which has the higher priority rights than the multiple wireless stations) uses the wireless bandwidth during an entirety of the control period because it is a higher priority entity; the wireless stations are allocated use of the wireless bandwidth for a less-than-all portion of the control period in accordance with the duty cycle. In one embodiment, operating in the shared mode includes varying usage of the wireless bandwidth by the wireless stations during the control period cycle instead of completely prohibiting the wireless stations from using the wireless bandwidth while it is used by the incumbent entity.

In still further example embodiments, the communication management hardware detects use of the wireless bandwidth via detecting implementation of RADAR (RAdio Detection And Ranging) by the entity in a vicinity of the multiple wireless stations.

Note that the control period (partitioned in time and/or frequency) can be configured to include any number of portions. In one embodiment, the control period includes a first portion and a second portion. The first portion of each control period while in the shared mode is allocated for use by the multiple wireless stations in a particular region to communicate amongst each other via the wireless bandwidth. The second portion of the control period while in the shared mode is allocated for use by the entity to use the wireless bandwidth in the particular region in which the wireless stations reside.

Further embodiments herein include, via the communication management hardware, in the first portion of the control period, limiting use of the wireless bandwidth by the multiple wireless stations during time slots in which the higher priority entity is scheduled to transmit wireless signals using the wireless bandwidth.

In yet further example embodiments, the multiple wireless stations, in order to maintain wireless connectivity, communicate amongst each other at reduced wireless power levels during the second portion of the respective control period with respect to wireless power levels implemented by the wireless stations in the first portion of the respective control period. The lower wireless power levels in the second portion of the control period ensure that the wireless stations do not interfere with the higher priority entity user in the second portion of the control period.

Still further embodiments herein include, via the communication management hardware, allocating a portion of the control period and corresponding use of the wireless bandwidth by the multiple wireless stations depending on a direction of the entity transmitting wireless signals using the wireless bandwidth. For example, if the incumbent entity (higher priority entity) communicates in a direction of the wireless stations, the communication management hardware limits use of the wireless bandwidth by the wireless stations at such time. Conversely, if the incumbent entity communicates in a direction opposite the wireless stations, the communication management hardware provides full use of the wireless bandwidth by the wireless stations.

In still further example embodiments, the communication management hardware notifies one or more of the multiple wireless stations of a portion of the duty cycle assigned for use by the one or more wireless stations.

In further example embodiments, the multiple wireless stations include a wireless base station and a mobile communication device. The communication management hardware transmits a first notification from the wireless base station to the mobile communication device; the first notification indicates a power level at which the wireless base station is configured to wirelessly transmit first wireless communications during a less-than-all portion of the control period in accordance with the duty cycle. The communication management hardware transmits a second notification from the wireless base station to the mobile communication device; the second notification controls a power level at which the mobile communication device is configured to wirelessly transmit wireless communications to the wireless base station during the less-than-all portion of the control period in accordance with the duty cycle.

Further embodiments herein include, via the communication management hardware, in response to switching from a first mode of the multiple wireless stations being assigned use of the wireless bandwidth to the shared mode, adjusting a repetition gain of communicating from a first wireless station to a second wireless station of the multiple wireless stations.

Still further example embodiments herein include, via the communication management hardware, reducing a rate of transmitting a wireless reference signal from a first wireless station of the multiple wireless stations in response to switching from a first mode of the multiple wireless stations being assigned full use of the wireless bandwidth (in which the higher priority entity does not use the wireless bandwidth) to the shared mode (in which the higher priority entity does use the wireless bandwidth).

Note that, in further example embodiments, the duty cycle varies over time in accordance with needs of the higher priority entity.

Embodiments herein are useful over conventional techniques. For example, the use of a time division sharing control period mode in accordance with a duty cycle as discussed herein enables the lower priority users to continue use of assigned wireless bandwidth as opposed to being prohibited from use during times when the higher priority entity uses the wireless bandwidth.

Note that any of the resources as discussed herein can include one or more computerized devices, wireless stations, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein. Accordingly, embodiments herein are directed to a method, system, computer program product, etc., that supports operations as discussed herein.

One embodiment includes a computer readable storage medium and/or system having instructions stored thereon to facilitate use of a wireless channel by wireless stations supporting different communication protocols. The instructions, when executed by computer processor hardware, cause the computer processor hardware (such as one or more co-located or disparately processor devices) to: assign wireless bandwidth for use by wireless stations in a wireless network environment to communicate amongst each other; monitor use of the wireless bandwidth; and in response to detecting use of the wireless bandwidth by an entity having higher priority rights than the wireless stations, operate in a shared mode in which the wireless stations and the entity share use of the wireless bandwidth in a control period according to a duty cycle.

The ordering of the steps above has been added for clarity sake. Note that any of the processing steps as discussed herein can be performed in any suitable order. Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of wireless technology supporting simultaneous use of multiple wireless protocols (such as 5G New Radio and LTE) by multiple wireless stations. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 9 is an example diagram illustrating notification of control period and duty cycle information associated with shared use of wireless resources according to embodiments herein.

FIG. 10 is an example diagram illustrating notification of control period and duty cycle control information supplied to one or more wireless stations according to embodiments herein.

Figure 1:
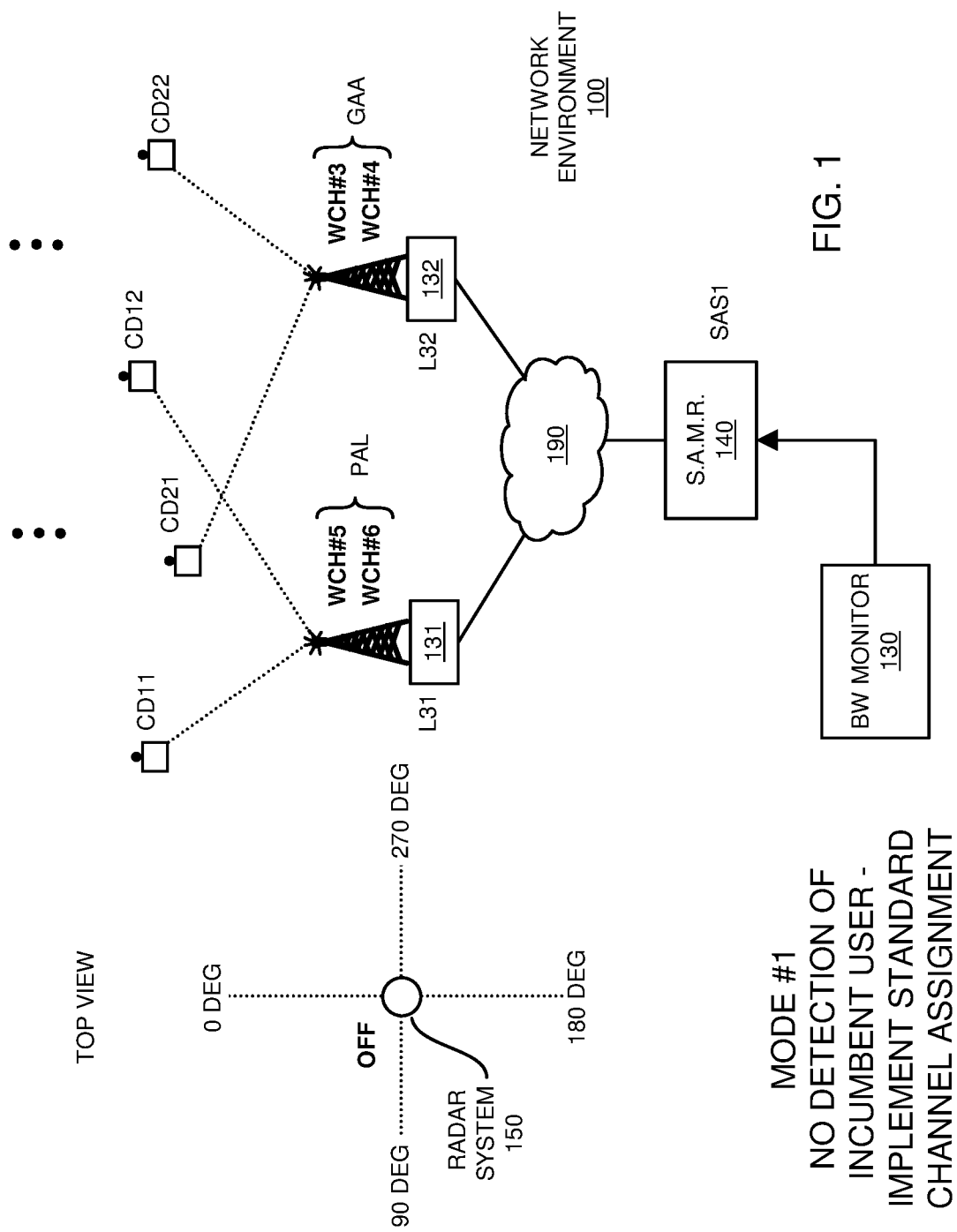
FIG. 1 is an example diagram illustrating a wireless network environment and operation in a first wireless channel allocation mode according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a system includes communication management hardware that controls operation of multiple wireless stations in a network environment. For example, the communication management hardware initially assigns wireless bandwidth for use by multiple wireless stations in a wireless network environment to communicate amongst each other. The communication management hardware monitors use of the wireless bandwidth. In response to detecting use of the wireless bandwidth by an incumbent entity having higher priority rights than the multiple wireless stations, the communication management hardware operates in a shared mode in which both the multiple wireless stations and the incumbent entity share use of the wireless bandwidth in each of multiple control periods according to a duty cycle in which the wireless stations are provided full use of the wireless bandwidth during a first portion of a respective control period and the wireless stations are provided reduced use of the wireless channels for a second portion of the respective control period.

Now, more specifically, FIG. 1 is an example diagram illustrating a wireless network environment and operation in a first mode according to embodiments herein.

As shown in this example embodiment, network environment 100 includes bandwidth monitor 130, spectrum allocation management resource 140, wireless station 131 at location L31, wireless station 132 at location L32, communication devices (user equipment or UEs) CD11, CD12, . . . , communication devices (user equipment or UEs) CD21, CD22, . . . , and network 190 (such as including the Internet, wireless infrastructure, etc.).

Note that each of the resources (such as wireless stations, communication devices, spectrum allocation management resources, spectrum monitor, spectrum manager, etc.) in network environment 100 can be configured to include appropriate hardware, software, or combination of hardware and software to carry out respective operations as discussed herein.

For example, spectrum allocation management resource 140 (i.e., a communication management resource) can be configured as spectrum allocation management hardware, spectrum allocation management software, or a combination of spectrum allocation management hardware and spectrum allocation management software; bandwidth monitor 130 can be configured as bandwidth monitor hardware, bandwidth monitor software, or a combination of bandwidth monitor hardware and bandwidth monitor software; each communication management resource (such as in the spectrum allocation management resource 140, wireless base stations, communication devices) can be configured as communication management hardware, communication management software, or a combination of communication management hardware and communication management software; and so on.

Each communication device is mobile or stationary with respect to a corresponding wireless station providing it access to network 190.

As further shown, wireless station 131 (such as operated by a first wireless network service provider) is disposed at location L31 providing communication devices CD11, CD12, etc., access to network 190; wireless station 132 (such as operated by a second wireless network service provider) is disposed at location L32 providing communication devices CD21, CD22, etc., access to network 190; and so on.

Wireless network environment 100 includes wireless base stations operated by any number of different wireless network service providers.

In this example embodiment, the wireless base station 131 is a PAL wireless channel user while wireless base station 132 is a GAA wireless channel user. Assume in this example embodiment that the spectrum allocation management resource 140 assigns wireless base station 131 (such as a PAL user) and corresponding communication devices CD11, CD12, etc., use of wireless channels 5 and 6. The spectrum allocation management resource 140 assigns wireless base station 132 and corresponding communication devices CD21, CD22, etc., use of wireless channels 3 and 4.

As its name suggests, bandwidth on 130 monitors use of wireless bandwidth by higher priority entities in the wireless network environment 100. The bandwidth monitor can be configured to receive information regarding usage of bandwidth in a suitable manner. For example, the bandwidth monitor 130 can be configured to monitor use of the wireless bandwidth by the RADAR system 150 via detecting wireless signals of a particular type that are known to be transmitted from the RADAR system 150. Additionally, or alternatively, the bandwidth monitor 130 receives one or more notifications indicating scheduled or actual use of the wireless bandwidth by the RADAR system 150.

As previously discussed, the wireless base station 131 initially registers with the spectrum allocation management resource 140 (communication management resource). Assume in this example embodiment that spectrum allocation management resource 140 (such as a so-called spectrum access system) assigns the wireless base station 131 and corresponding one or more communication devices CD11, CD12, etc., use of wireless channels 5 and 6 (such as PAL channels).

The wireless base station 132 initially registers with the spectrum allocation management resource 140. Further assume in this example embodiment that spectrum allocation management resource 140 (such as a spectrum access system) assigns the wireless base station 132 use of wireless channels 3 and 4 (such as GAA wireless channels).

An incumbent user has higher channel usage and interference protection priority rights than both the PAL wireless channel users and GAA wireless channel users. PAL users have higher priority rights than GAA users.

As shown in FIG. 1, when no incumbent use of the wireless channels is detected by the bandwidth monitor 130 or other entity, the spectrum allocation management resource 140 and corresponding wireless stations in the wireless network environment 100 operate in mode #1 (standard mode of channel assignment and usage) in which the wireless stations (wireless base stations, communication devices, etc.) use the allocated wireless channels 3, 4, 5, and 6 without regard to any higher priority entity.

Figure 2:
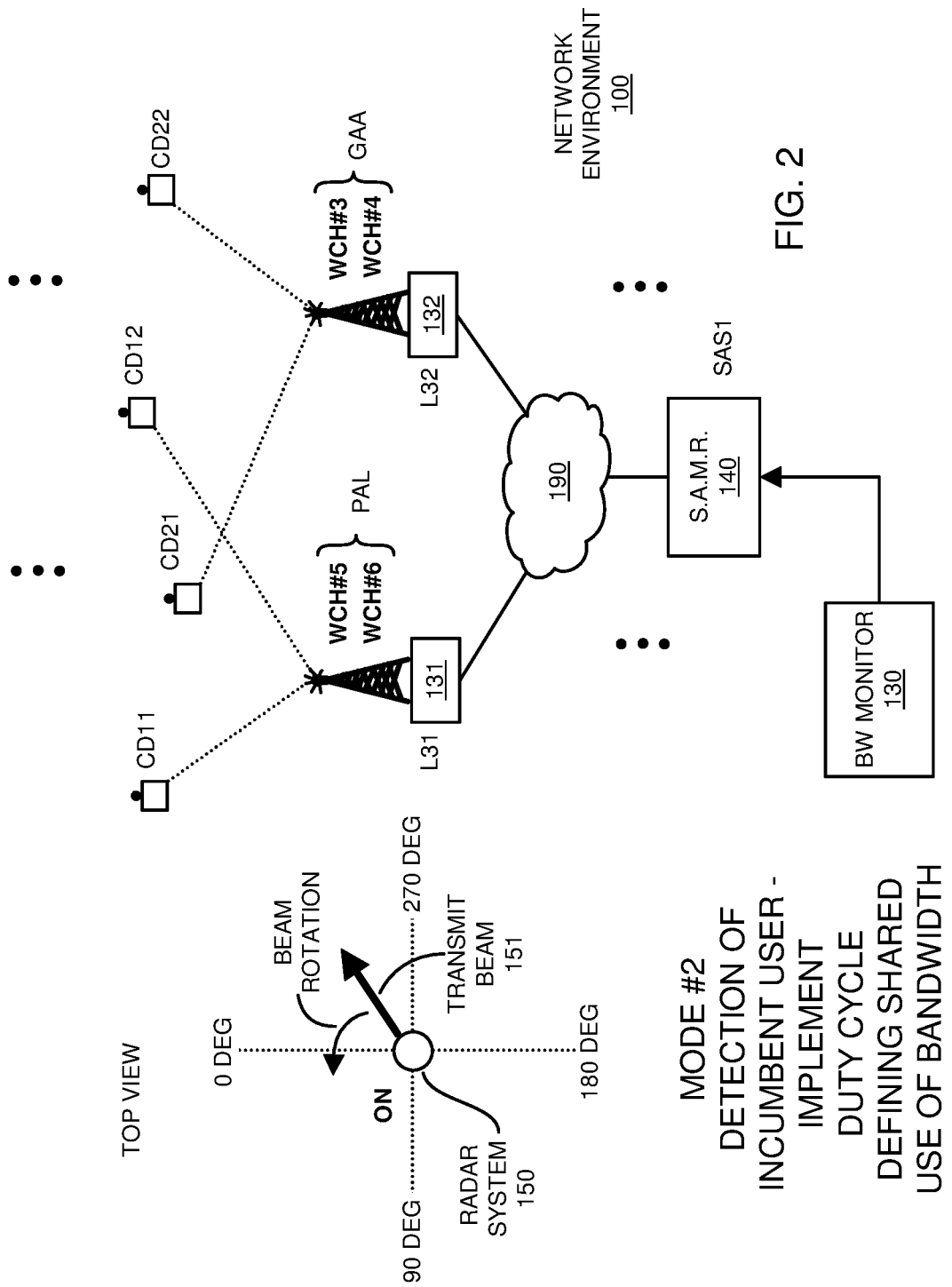
FIG. 2 is an example diagram illustrating a wireless network environment and operation in a second shared wireless channel allocation mode according to embodiments herein.

FIG. 2 is an example diagram illustrating a wireless network environment and operation in a second mode according to embodiments herein.

As previously discussed, when bandwidth is not used by a respective higher priority entity, the spectrum allocation management resource 140 (such as communication management hardware) initially assigns wireless bandwidth for use by multiple wireless stations and communication devices in a wireless network environment to communicate amongst each other. The spectrum allocation management resource 140 monitors use of the wireless bandwidth by one or more higher priority entities based on communications received from the bandwidth monitor 130 or other suitable one or more entities. In response to detecting use of the wireless bandwidth by an incumbent entity operating the RADAR system 150 having higher priority rights than the multiple wireless stations and communication devices, the spectrum allocation management resource 140 initiates operation in a shared duty cycle mode in which both the multiple wireless stations (i.e., wireless base stations, communication devices, etc.) and the incumbent entity share use of the wireless bandwidth according to a duty cycle.

For example, in one embodiment, the higher priority entity operates the RADAR system 150 to detect presence of airborne objects. For example, via transmission of transmit beam 151 (such as a wireless ping signal) in a first direction, the RADAR system 150 monitors for presence of ping reflections off any objects. Based on a timing of reflections, the RADAR system 150 is able to identify presence of one or more objects in different directions with respect to the RADAR system 150.

For each ping, and to scan 360 degrees, the RADAR system 150 rotates the direction from which the transmit beam 151 is directed. Thus, in certain portions of a full rotation, the transmit beam 151 from the RADAR system 150 is transmitted in a direction of the wireless baser stations and the communication devices, while in other portions of full rotation, the transmit beam 151 from the RADAR system 150 is transmitted in a direction opposite the wireless base stations and the communication devices.

As further shown, in response to detecting the use of the RADAR system 150, embodiments herein include switchover from mode #1 to operation in a second mode of operation (mode #2).

Figure 3:
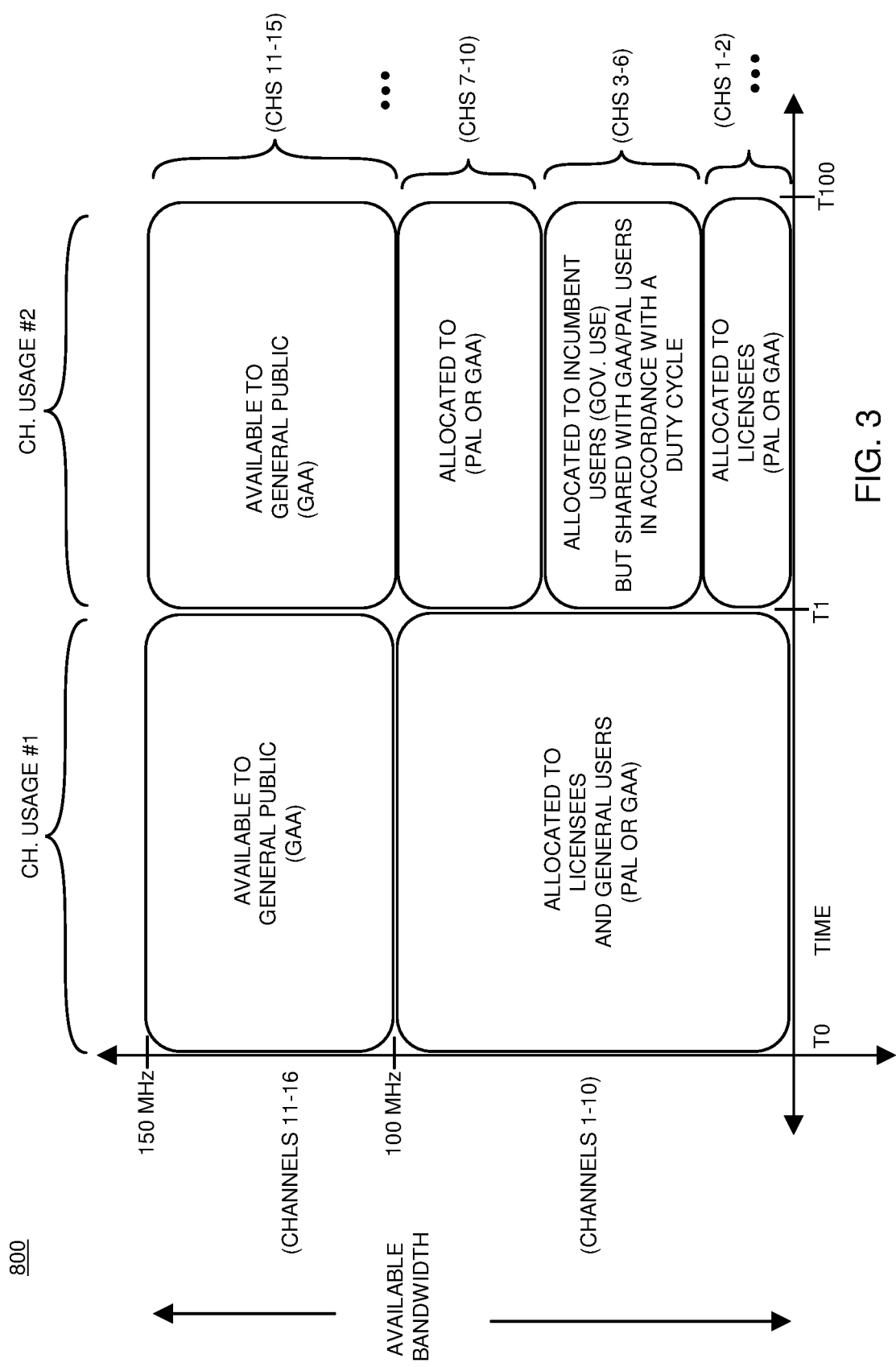
FIG. 3 is an example diagram illustrating allocation of spectrum from a CBRS (Citizen Band Radio Service) and implementation of adjustments according to embodiments herein.

FIG. 3 is an example diagram illustrating allocation of spectrum from a CBRS (Citizen Band Radio Service) according to embodiments herein.

As previously discussed, spectrum allocation management resource 140 can be configured to allocate any suitable type of wireless spectrum (spectrum, wireless channels, etc.) for use by the communication devices such as wireless base stations in the network environment 100.

In one non-limiting example embodiment, the spectrum allocation management resource allocates spectrum (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, as previously discussed, the spectrum allocation management resource 140 (such as spectrum access systems, allocation management resource, or other suitable entity) keeps track, at any given time, which wireless channels or portions of the multi-tier wireless spectrum or multi-tier radio band (such as CBRS band) are available in the geographical region in which the network environment 100 resides. Between time T1 and time T5, embodiments herein include operating in mode #1. If government use (such as use via a so-called incumbent user operating RADAR system 150) is detected or requested via appropriate input (such as around time T5) to the allocation management resource 140, certain channels (such as those used by the general public) are no longer fully available for use as shown between time T5 and time T9. In such an instance, between time T5 and T9, the network operates in mode #2.

More specifically, in this example, graph 300 indicates that between time T0 and time T1 (such as mode #1 or first condition), there is no indication or detection of an incumbent user and thus wireless channels 1-10 are available for use by the wireless users (and potentially unlicensed GAA users) for use; channels 11-15 are available for use by unlicensed GAA users. In a manner as previously discussed, these channels are allocated for use by the wireless base stations in network environment 100.

As further shown, at or around time T1, assume that the bandwidth monitor 130 or other suitable entity detects use of the wireless channels 3, 4, 5, and 6 by an incumbent user (such as operating the RADAR system 150) having higher priority than both the PAL users and GAA users. In such an instance, the bandwidth monitor 140 notifies the spectrum allocation management resource 140 of such use prompting a change of use of the wireless channels by the wireless stations (wireless base stations 131, 132, etc., communication device CD11, CD12, CD21, CD22, etc.) according to a respective duty cycle mode (in mode #2) during which use of the wireless channels by the GAA and PAL is modified to accommodate operation of the RADAR system 150.

Figure 4:
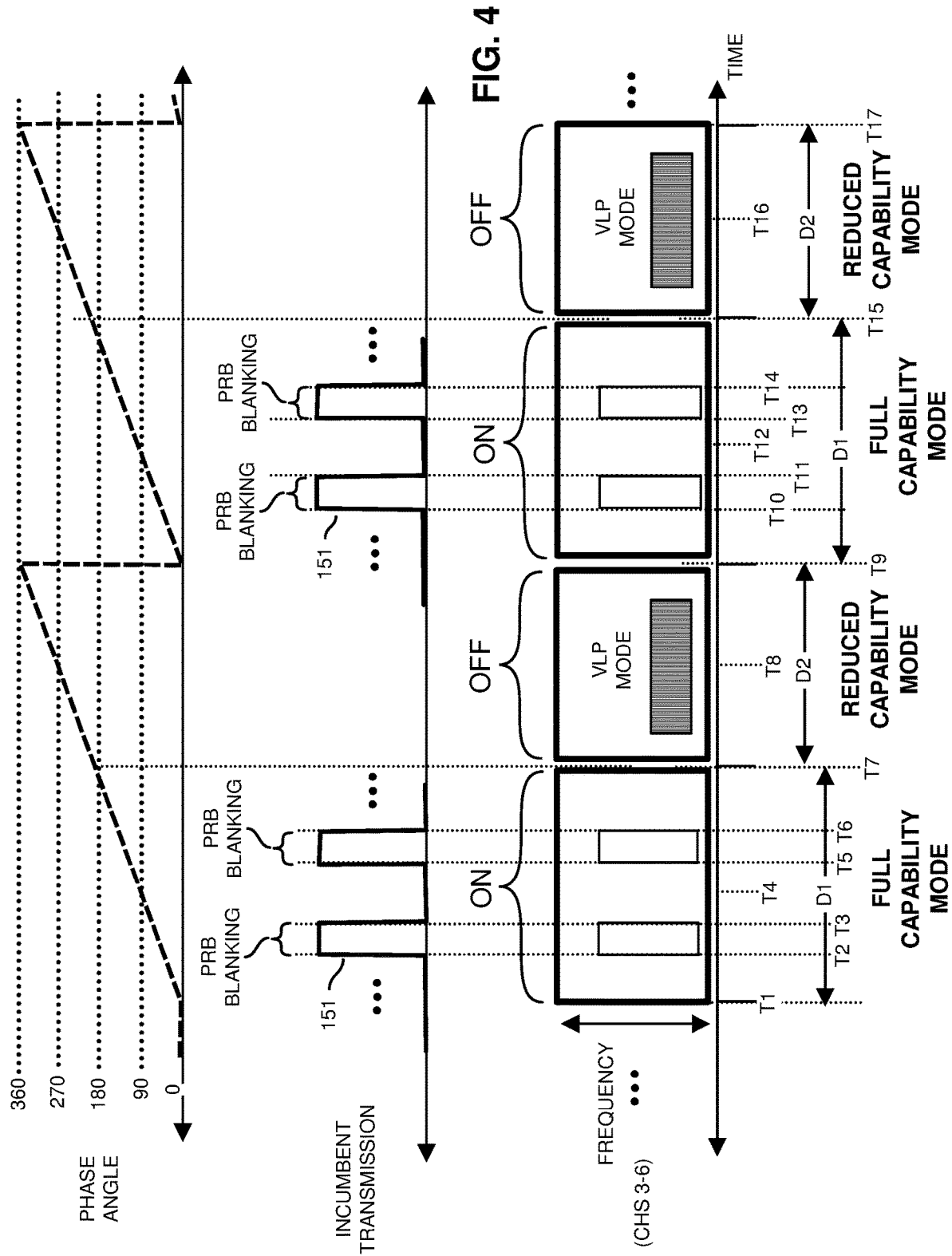
FIG. 4 is an example diagram illustrating implementation of time/frequency division duty cycle control of sharing wireless resources according to embodiments herein.

FIG. 4 is an example diagram illustrating implementation of duty cycle control of sharing wireless resources according to embodiments herein.

As previously discussed, the bandwidth monitor 130 or other suitable entity such as any of one or more wireless stations, communication devices, etc., monitor for use of the wireless channels by the higher priority entity operate RADAR system 150.

In response to detecting usage of the RADAR system 150 by the higher priority entity, the wireless base stations, communication devices, etc., switchover to operation in the duty cycle mode (mode #2). Accordingly, embodiments herein include communication management hardware (such as in any suitable entity such as bandwidth monitor 130, spectrum allocation management resource 140, wireless base stations, communication devices, etc.) that detect(s) use of the allocated wireless bandwidth via detecting presence of RADAR (RAdio Detection And Ranging) signals (such as transmit beam 151) by the RADAR system 150. The communication management hardware such as spectrum allocation management resource 140 or other suitable one or more entities notify one or more of the multiple wireless stations and communication devices of a portion of the cycle in which use of the allocated wireless channels 3, 4, 5, and 6 is restricted.

In this example embodiment, while in mode #2 in which the higher priority entity operates the RADAR system 150, the wireless stations 131, 132, etc., and communication devices CD11, CD12, CD21, CD22, etc., operate in a respective control period (such as first control period between time T1 and T9, second control period between T9 and T17, and so on) in accordance with duty cycle 410.

For example, during time duration D1 of the duty cycle 410 between time T1 and T7 of a first control period, when the RADAR system 150 generates transmit beam 151 between angle 0 and 180 degrees, the lower priority entities (i.e., wireless station 131, wireless station 132, etc., communication device CD11, CD12, CD21, CD22, etc.) operate in a full capability mode of using allocated wireless channels 3-6 because RADAR system 150 transmits the transmit beam 151 away from the lower priority entities (wireless base stations, communication devices, etc.).

In one nonlimiting example embodiment, if desired, the lower priority entities implement a so-called PRB blanking during times in which the RADAR system 150 transmits or listens for an echo associated with the transmit beam 151. For example, assume that the RADAR system 150 is operated to transmit between time T2 and time T3, between time T5 and time T6, etc. In such an instance, to provide extra protection to the higher priority entity (i.e., the incumbent user) operating the RADAR system 150, the lower priority entities (such as wireless base stations, communication devices, etc.) implement PRB blanking in which the wireless stations either transmit at reduced power levels or do not transmit at all in one or more channels, sub-channels, etc., between time T2 and time T3, between time T5 and time T6, etc.

During time duration D2 of a respective control period, when the RADAR system 150 generates transmit beam 151 between approximately angle 180 and 359 degrees, the lower priority entities (i.e., wireless station 131, wireless station 132, etc., communication device CD11, CD12, CD21, CD22, etc.) operate in a reduced capability mode of using allocated wireless channels 3-6 because RADAR system 150 transmits the transmit beam 151 in the direction of these lower priority entities. The reduced capability mode prevents the lower priority entities from interfering with the higher priority entity operating the RADAR system 150.

Thus, even though the higher priority entity (which has the higher priority rights than the multiple wireless stations) uses the wireless bandwidth (such as wireless channels 3, 4, 5, and 6) during an entirety of each control period (such as between time T1 and time T9; between time T9 and T17; and so on), the wireless stations and communication devices are provided continued allocation of the wireless bandwidth (such as wireless channels 3, 4, 5, and 6) for a less-than-all portion (such as duration D2) of the control period during mode #2. However, during mode #2, the lower priority entities operate in accordance with one or more stringent usage rules such as lower wireless transmit power levels, non-use of sub-channels, etc., such that communications from the wireless base stations and communication devices does not interfere with the RADAR system 150.

In one embodiment, the implementation of reduced capability during duration D2 is sufficient to maintain wireless critical connectivity amongst the wireless stations and the communication devices allocated wireless channels 3, 4, 5, and 6. For example, the wireless base stations and communication devices communicate amongst each other at reduced wireless power levels during the second portion of the cycle (duration D2) with respect to wireless power levels implemented by the wireless stations/communication devices in the first portion of the cycle (duration D1). As previously discussed, in one embodiment, the lower wireless power levels in the second portion of the respective control period ensure that the wireless stations/communication devices do not interfere with the higher priority entity operating the RADAR system 150.

Varying usage of the wireless bandwidth by the wireless stations and communication devices in mode #2 provides a better use of bandwidth instead of prohibiting the wireless stations and communication devices from using the wireless bandwidth while it is used by the incumbent entity operating the RADAR system 150.

Note further that each respective control period in mode #2 can be configured to include any number of portions. In one embodiment, each mode #2 cycle includes a first portion (such as duration D1) and a second portion (duration D2). The first portion of the cycle (duration D1) is allocated for use by the multiple wireless stations in a particular region to communicate amongst each other via the wireless bandwidth without restriction. The second portion of the cycle (duration D2) is allocated for use by the higher priority entity to use the wireless bandwidth in the particular region in which the wireless stations reside. Note that, in further example embodiments, the duty cycle varies over time in accordance with needs of the higher priority entity.

Further embodiments herein include, via the communication management hardware (spectrum allocation management resource 140), reducing a rate of transmitting one or more wireless signals, reference signals, etc., from a first wireless station of the multiple wireless stations in response to switching from mode #1 of the multiple wireless stations being assigned full use of the wireless bandwidth (in which the higher priority entity does not use the wireless bandwidth) to mode #2 (in which the higher priority entity does use the wireless bandwidth). One embodiment herein includes, in response to switching from mode #1 of the multiple wireless stations being assigned use of the wireless bandwidth to the mode #2, adjusting (via the spectrum allocation management resource 140 or other suitable entity) a repetition gain of communicating: i) in the downlink from a wireless base station to a communication device, and/or ii) in the uplink from the communication device to the wireless base station.

As previously discussed, the spectrum allocation management resource 140 or other suitable entity notifies the wireless base stations 131, 132, etc., to operate in mode #2 when the higher priority entity operates the RADAR system 150. Each of the wireless base stations implements a communication management resource. In such an instance, the communication management resource of, for example, wireless base station 131 transmits a first notification from the wireless base station 131 to the mobile communication device CD11; the first notification indicates a power level at which the wireless base station 131 is configured to wirelessly transmit first wireless communications during duration D2 (such as a less-than-all portion of the duty cycle). The communication management resource of the wireless base station 131 transmits a second notification from the wireless base station to the mobile communication device CD1; the second notification controls a power level at which the mobile communication device CD11 is to wirelessly transmit wireless communications from the communication device CD11 to the wireless base station 131 during the duration D2. As previously discussed, adjustment of the wireless power levels of the wireless base stations (in a downlink direction) and the communication devices (in an uplink direction) reduces a possibility of the wireless stations interfering with the RADAR system 150.

Further embodiments herein include implementation of a two-state duty cycle for a NR cell (including wireless stations as discussed herein) with one or more RRC_CONNECTED UE(s) in addition to IDLE and INACTIVE UEs.

The two states are: i) an ON state of duration TON (such as duration D1), with regular-power DL and UL transmissions (control channels, data channels, synchronization and reference signals) and potential frequency-domain scheduling restrictions (e.g., PRB blanking via existing higher-layer or DCI-based indications), and ii) an OFF state of duration TOFF (such as duration D2) with a small set of very low power (VLP) transmissions.

As previously discussed, the duty cycle associated with implementing shared use of the available wireless bandwidth may vary. For example, in one embodiment, the of ON/OFF state durations are selected from a pre-defined set of values may be provided by a spectrum administrator, or may be left to network implementation.

In further example embodiments, the ON state (such as duration D1 in which the wireless stations are provided full capability and use of allocated wireless channels) can be configured to coincide with time periods when the radar antenna of the RADAR system 150 is pointing away from the NR cell (such as wireless station 131, wireless station 132, communication devices CD11, CD12, communication devices CD21, CD22, etc.).

In accordance with further example embodiments, as previously discussed, in order to provide additional protection to the RADAR system 150, so-called PRB (Physical Resource Block) blanking may be used to preclude Tx/Rx in resources that coincide with the radar pulse bandwidth associated with transmit beam 151 from the RADAR system 150. Thus, embodiments herein include, via the communication management hardware control operation of the lower priority entities, in the first portion of the cycle (duration D1) such as between time T2 and T3, between time T5 and T6, etc., limiting use of the wireless bandwidth by the multiple wireless stations and communication devices during time slots (T2 to T3, T5 to T6, etc.) in which the higher priority entity is scheduled to transmit wireless signals using the wireless bandwidth.

For the OFF state (such as duration D2 in which the wireless stations are provided full capability and use of allocated wireless channels), VLP (Very Low Power) mode is be enabled for SS/PBCH (Synchronization Signal block/Physical Broadcast Channel) blocks (SSB or Synchronization Signal Block), TRS (Tracking Reference Signal), and/or UL SRS. This is the minimum set of transmissions needed to maintain DL/UL sync, perform beam management, and radio link monitoring. The sequel focuses on VLP SSB and SRS.

Figure 5:
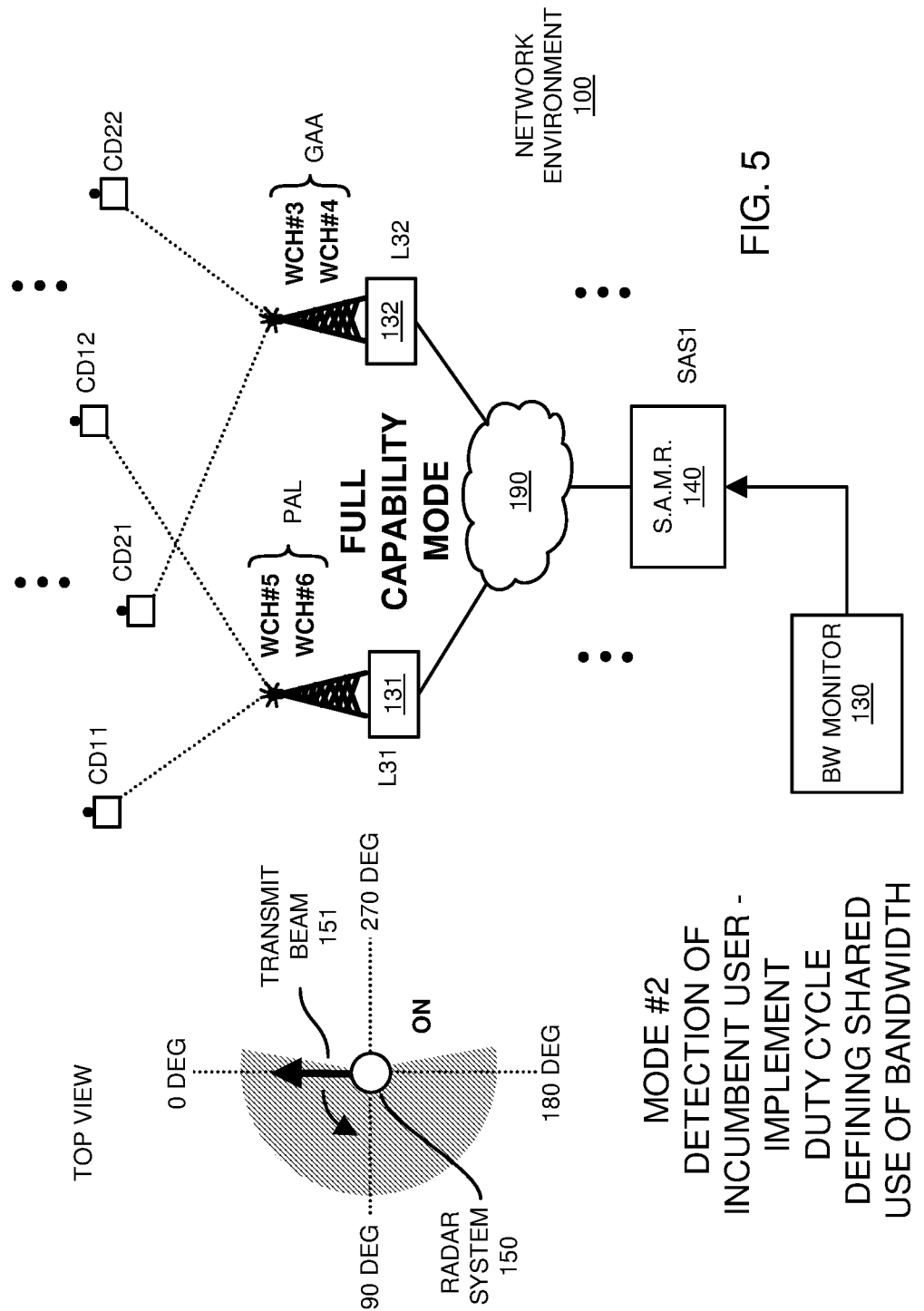
FIG. 5 is an example diagram illustrating an example wireless network operating in a first portion of a respective control period in which a respective lower priority entity and higher priority entity share use of wireless bandwidth according to embodiments herein.

FIG. 5 is an example diagram illustrating an example top view of a wireless network in which a respective lower priority entity and higher priority entity share use of wireless bandwidth during mode #2 according to embodiments herein.

As shown, during the shared duty cycle mode, such as at or around time T1, the RADAR system 150 transmits the transmit beam 151 at approximately zero degrees, which is not in the direction of the wireless stations in wireless network environment 100. In such an instance, because the transmit beam 151 is directed away from the region in which the wireless stations (i.e., wireless station 131, wireless station 132, communication devices CD11, CD12, CD21, CD22, etc.) reside, there is a low or no likelihood of the wireless stations allocated use of wireless channels 3, 4, 5, and 6 from interfering with the RADAR system 150. Accordingly, the wireless stations are allowed full use of the allocated wireless channels 3, 4, 5, and 6 while the higher priority entity (incumbent user) has full use of the wireless channels 3, 4, 5, and 6 as well.

Figure 6:
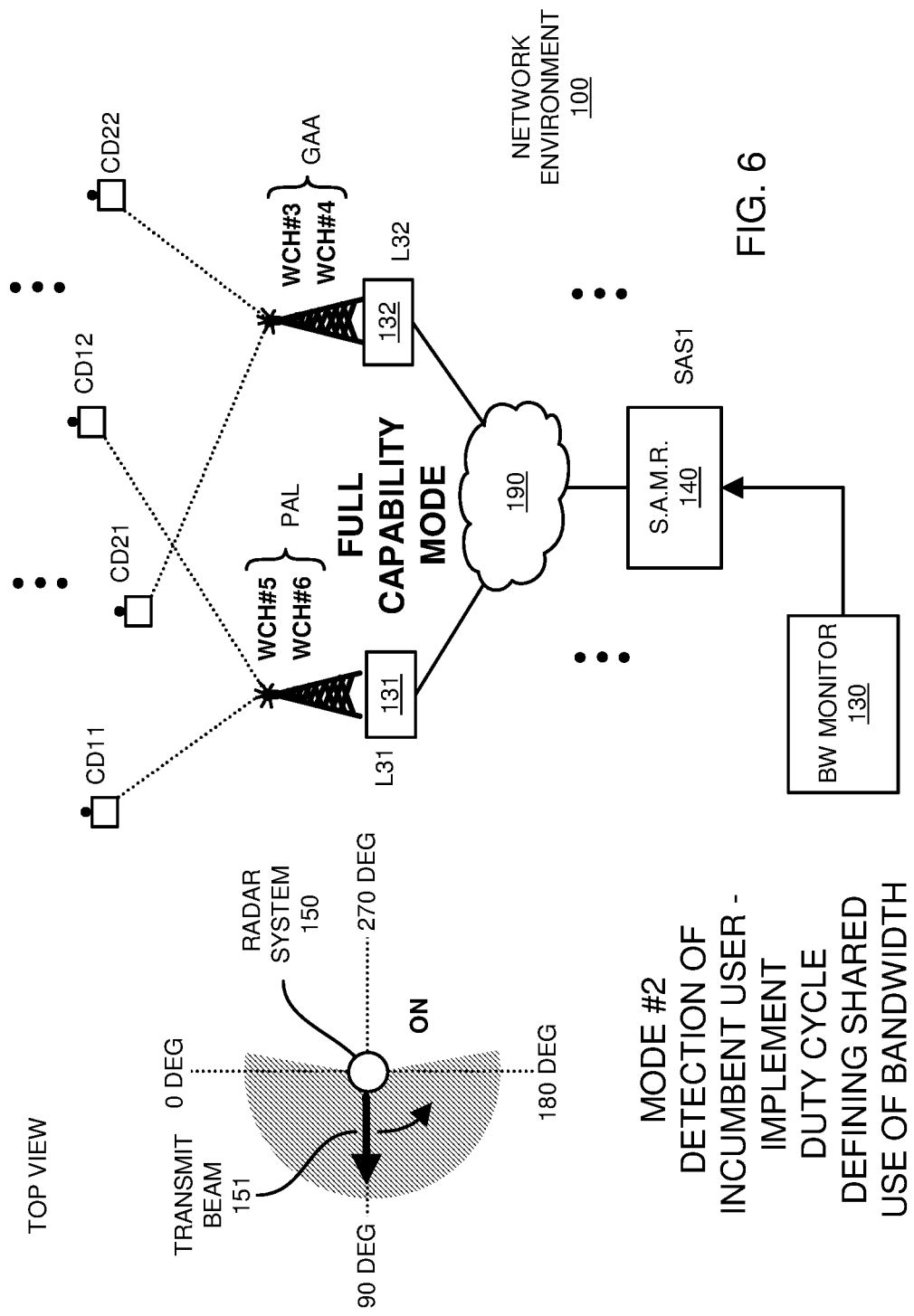
FIG. 6 is an example diagram illustrating an example wireless network operating in a second portion of a respective control period in which a respective lower priority entity and higher priority entity share use of wireless bandwidth according to embodiments herein.

FIG. 6 is an example diagram illustrating an example wireless network in which a respective lower priority entity and higher priority entity share use of wireless bandwidth during mode #2 according to embodiments herein.

As shown, during the shared duty cycle mode, at or around time T4, the RADAR system 150 transmits the transmit beam 151 at approximately ninety degrees, which is not in the direction of the wireless stations in wireless network environment 100. In such an instance, because the transmit beam 151 is directed away (such as opposite) from the region in which the wireless stations (i.e., wireless station 131, wireless station 132, communication devices CD11, CD12, CD21, CD22, etc.) reside, there is a low or no likelihood of the wireless stations allocated use of wireless channels 3, 4, 5, and 6 from interfering with the RADAR system 150. Accordingly, the wireless stations are allowed full use of the allocated wireless channels 3, 4, 5, and 6 while the higher priority entity (incumbent user) has full use of the wireless channels 3, 4, 5, and 6 as well.

Figure 7:
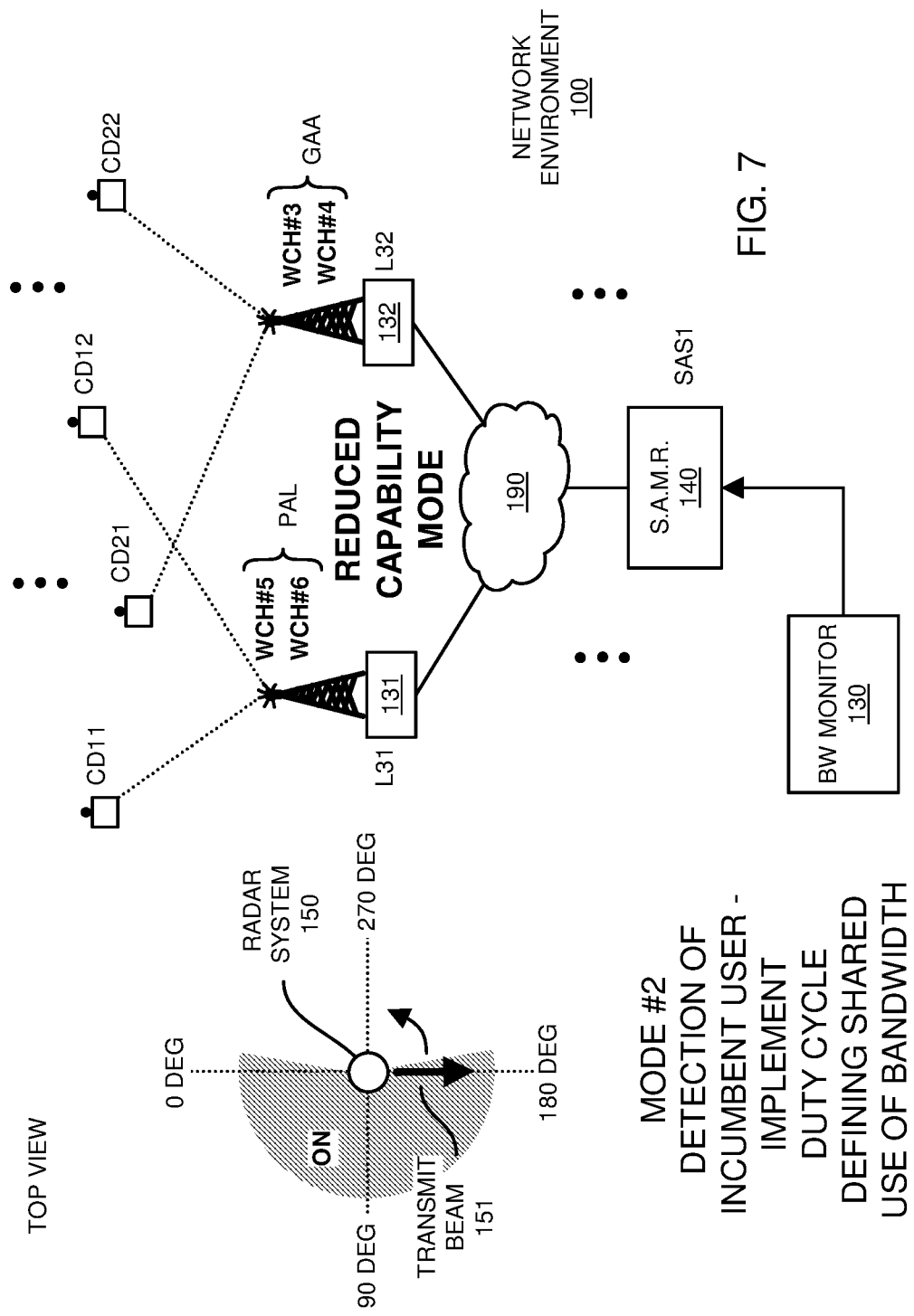
FIG. 7 is an example diagram illustrating an example wireless network operating in a third portion of a respective control period in which a respective lower priority entity and higher priority entity share use of wireless bandwidth according to embodiments herein.

FIG. 7 is an example diagram illustrating an example wireless network in which a respective lower priority entity and higher priority entity share use of wireless bandwidth during mode #2 according to embodiments herein.

As shown, during the shared duty cycle mode, at or around time T7, the RADAR system 150 transmits the transmit beam 151 at approximately one hundred and eighty degrees, which is not in the direction of the wireless stations in wireless network environment 100. In such an instance, because the transmit beam 151 is generally directed away from the region in which the wireless stations (i.e., wireless station 131, wireless station 132, communication devices CD11, CD12, CD21, CD22, etc.) reside, there is a low or no likelihood of the wireless stations allocated use of wireless channels 3, 4, 5, and 6 from interfering with the RADAR system 150. Accordingly, the wireless stations are allowed full use of the allocated wireless channels 3, 4, 5, and 6 while the higher priority entity (incumbent user) has full use of the wireless channels 3, 4, 5, and 6 as well.

Figure 8:
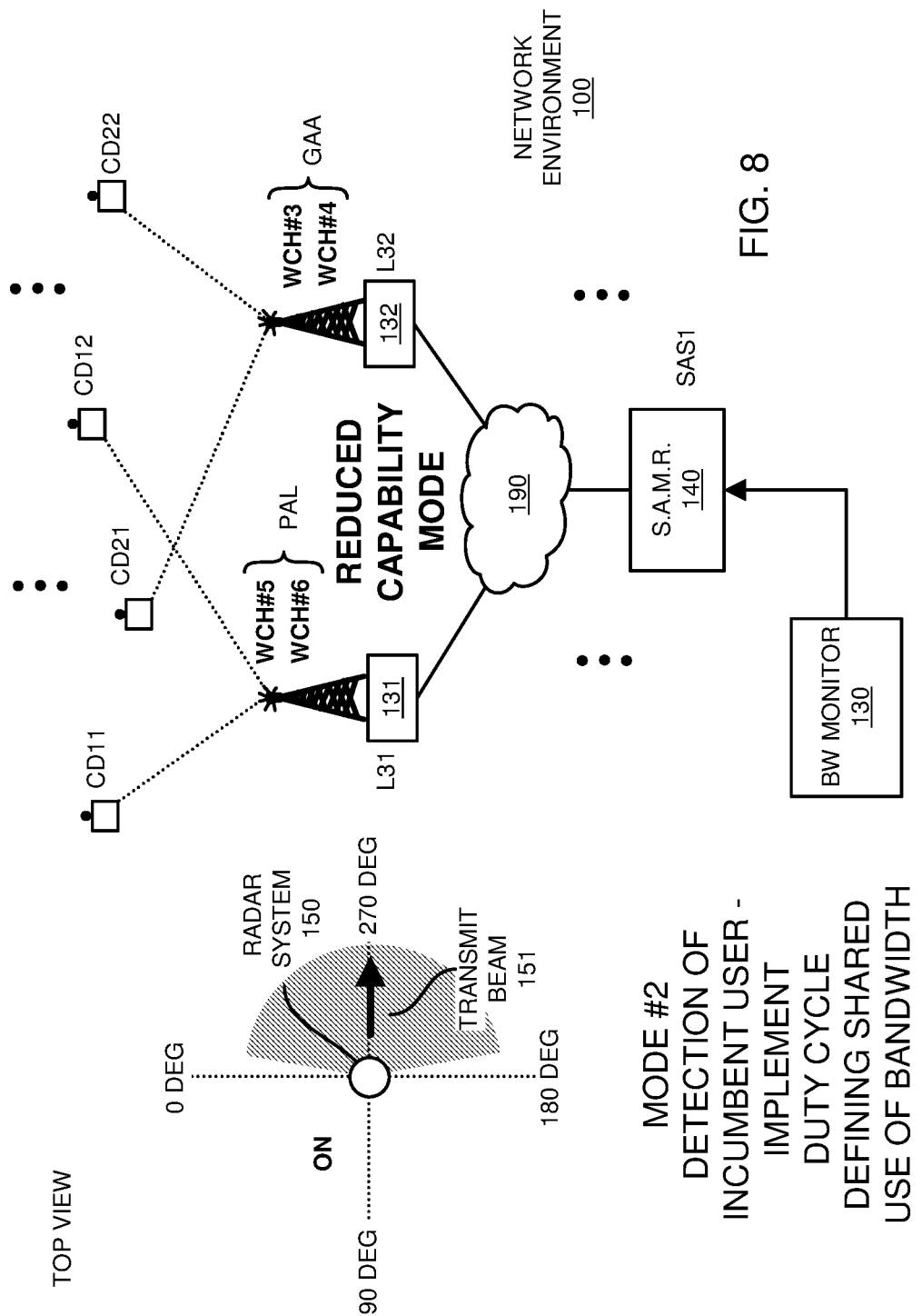
FIG. 8 is an example diagram illustrating an example wireless network operating in a fourth portion of a respective control period in which a respective lower priority entity and higher priority entity share use of wireless bandwidth according to embodiments herein.

FIG. 8 is an example diagram illustrating an example wireless network in which a respective lower priority entity and higher priority entity share use of wireless bandwidth during mode #2 according to embodiments herein.

As shown, when the RADAR system 150 transmits between approximately 190 degrees and 355 degrees, the wireless stations operate in a reduced capability mode (for duration D2).

For example, during the shared duty cycle mode #2, at or around time T8, the RADAR system 150 transmits the transmit beam 151 at approximately 270 degrees, which is in the direction of the wireless stations in wireless network environment 100. In such an instance, because the transmit beam 151 is directed toward the region in which the wireless stations (i.e., wireless station 131, wireless station 132, communication devices CD11, CD12, CD21, CD22, etc.) reside, there is a likelihood of the wireless stations allocated use of wireless channels 3, 4, 5, and 6 interfering with the RADAR system 150. Accordingly, the wireless stations are allowed none or only limited use of the allocated wireless channels 3, 4, 5, and 6 while the higher priority entity (incumbent user) has full use of the wireless channels 3, 4, 5, and 6.

Thus, embodiments herein include, via the communication management hardware such as implemented by one or more of spectrum allocation management resource 140, wireless base stations 131, 132, communication devices CD11, CD12, CD21, CD22, etc., allocating a portion of the cycle 410 and corresponding use of the wireless bandwidth (wireless channels 3-6) by the multiple wireless stations depending on a direction of the higher priority entity transmitting wireless signals (such as transmit beam 151) using the wireless bandwidth.

More specifically, if the RADAR system 150 (higher priority entity) communicates in a direction of the wireless stations such as in FIG. 8, the communication management hardware (such as in one or more of spectrum allocation management resource 140, wireless base stations 131, 132, . . . , communication devices CD11, CD12, CD21, CD22, . . . ) limits use of the wireless bandwidth (wireless channels 3-6) by the wireless stations at such time. Conversely, if the RADAR system 150 communicates in a direction opposite the wireless stations and communication devices such as generally showed in FIGS. 5-7, the communication management hardware associated with wireless network 100 provides full use of the wireless bandwidth (allocated wireless channels 3-6) by the wireless stations/communication devices.

FIG. 9 is an example diagram illustrating notification of a duty cycle associated with shared use of wireless resources according to embodiments herein.

Further embodiments herein include communicating one or more messages 910 to the communication devices to indicate the duty cycle and control period information associated with operation in mode #2. Such information indicates how the wireless stations are able to communicate during the ON state (duration D1) and OFF state (duration D2) for each cycle 410.

In one embodiment, one or more of the wireless base stations broadcast (e.g., SIB1) notifications (messages 910 or the like) and/or dedicated RRC signaling. Dynamic L2 or L1 signaling is not essential since DPA activation/deactivation or DFS is on a relatively long time scale (hundreds of NR radio frames). Broadcast signaling from the wireless base stations to the communication devices provides lower overhead since this is a cell-specific indication, and can also be received by IDLE UEs and INACTIVE UEs.

An example a broadcast RRC signaling message via a new IE dutycyclemode-r18 in SIB1 is shown in FIG. 9.

FIG. 10 is an example diagram illustrating notification duty cycle control information supplied to one or more wireless stations according to embodiments herein.

As previously discussed, upon switchover from mode #1 to the duty cycle control mode #2, embodiments herein include communication of control period information and duty cycle control information to one or more UEs (wireless stations such as communication devices CD11, CD12, etc.) in the wireless network environment 100.

For example, during the shared duty cycle mode, control communications (as shown in FIG. 10) to the wireless stations 131, 132, etc., and/or communication devices CD11, CD12, CD21, CD22, etc., prompts the wireless stations to switchover from a full operational mode #1 in which the wireless stations (wireless base stations and communication devices) are free to use the wireless channels all of the time without limitation to a shared mode #2 in which the wireless stations (wireless base stations and communication devices) are provided limited use of the wireless channels 3, 4, 5, and 6.

In one nonlimiting example embodiment, the corresponding new one or more control period and/or duty cycle control communications provide notification 1010 of the shared duty cycle mode #2 (such as IE DutyCycleMode-r18) from the wireless base stations 131, 132, etc., to the communication devices CD11, CD12, CD21, CD22, etc. Example fields/field values associated with such communications is as follows:

The recipient UE (user equipment such as communication device CD11, CD12, CD21, CD22, etc.) interprets the start of the duty cycle mode #2 as: the first ON duration commences from SFN mod T=0, where T is the ONperiod (such as duration D1) indicated in SIB1. Within each period (such as total duration D1+D2 in FIG. 4), TimeDurationON number of slots (in SCS of active DL BWP) are in ON state (duration D1) and remaining slots (such as duration D2) are in OFF state (reduced capability mode).

Boolean variables MeasureDL-OFFduration and Srs-OFFduration indicate whether DL SSB measurements or UL SRS transmissions are to be performed by the UE; if TRUE then the corresponding VLP SSB EPRE (in dBm) and an additional SRS power backoff for the active UL BWP (in dBm) are indicated.

Once the duty cycle indication is received by UEs (e.g., after re-reading SIB1 triggered by SI change indication in a paging occasion), their behavior is as follows:
 IDLE/INACTIVE_MODE UEs remain camped on the cell in the absence of other redirection signalling.
 CONNECTED_MODE UEs operate as usual during the ON state.
 CONNECTED_MODE UEs suspend DL monitoring and UL transmission of PRACH, scheduled/configured PUSCH and PUCCH during the OFF state, with the exception of VLP signals. Any multi-slot PDSCH/PUSCH transmissions that span both ON and OFF durations are truncated to within the ON duration. Cross-carrier scheduling grants from another cell that conflict with an OFF state are dropped. During RLM, VLP SSBs are given a lower weightage for in-sync/out-of-sync computations compared to ON state SSBs. Any SSB RSRP/RSRQ averaging across bursts takes VLP into account.

Figure 11:
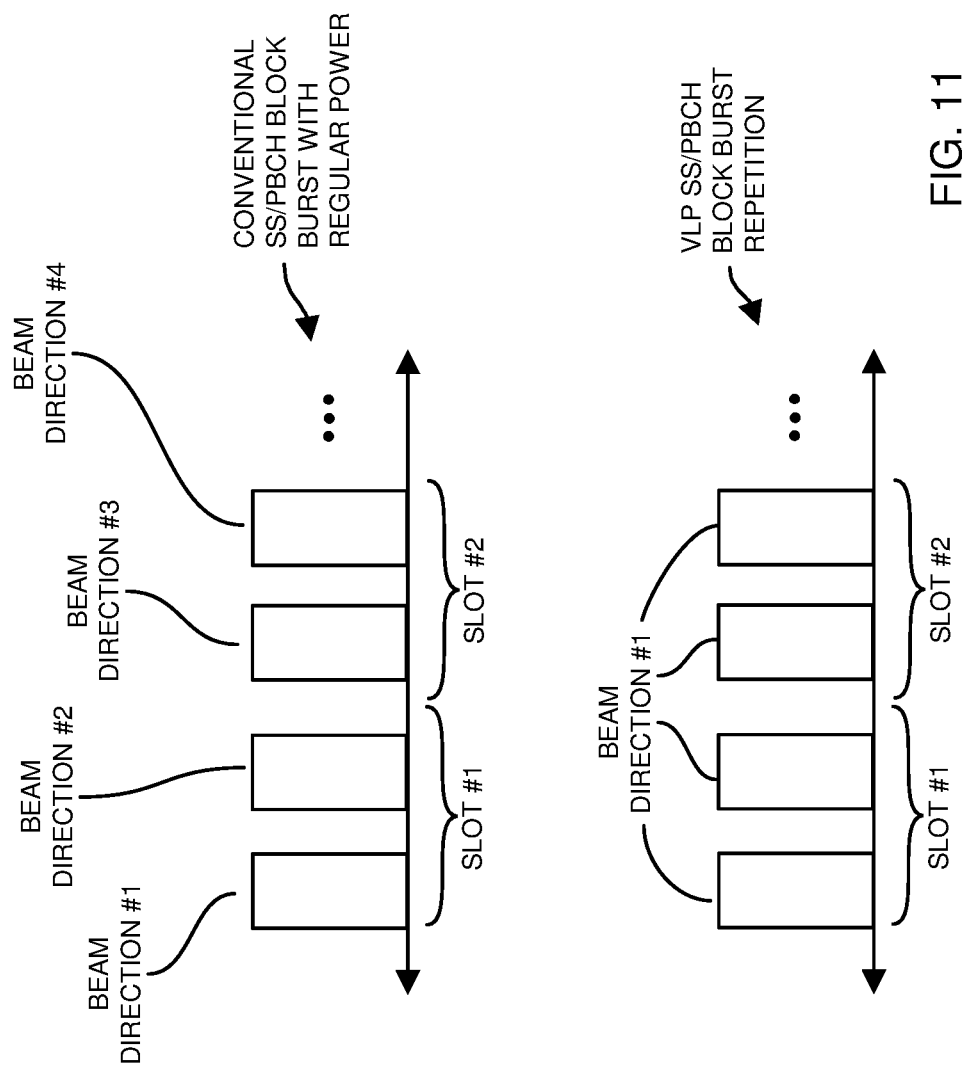
FIG. 11 is an example diagram illustrating implementation of a reduced power mode according to embodiments herein.

FIG. 11 is an example diagram illustrating implementation of a reduced power mode according to embodiments herein.

This example embodiment covers the design of VLP SSB and SRS transmissions.

In Rel-17, up to 20 SSBs can be transmitted per SSB burst in FR1, and up to 64 SSBs per burst in FR2 (within a half frame). A single SSB comprises 4 OFDM (Orthogonal Frequency Division Multiplexing) symbols with 240 occupied subcarriers in each of the last 3 symbols and 127 occupied subcarriers in the first symbol—a total of 847 occupied tones.

In one embodiment, the SSB EPRE (Synchronization Signal Block Energy Per Resource Element) is reduced by X0 dBm in the OFF state (duration D2 of mode #2) via DutyCycleMode-r18. In such an instance, the coverage and detection reliability of a single SSB can be improved by introducing a Xr dBm repetition gain at the cost of losing beam-sweeping flexibility. If the existing SSB frequency-domain and burst duration structure is retained in order to avoid the need for excessive L1 sample buffering at the UE, time-domain repetition using existing SSB patterns restores up to 13 dBm of SSB power in FR1 with 20-fold SSB repetition.

In one embodiment, additional repetition gain is made by adding an extra SSB per slot, i.e., a new SSB pattern, or by expanding SSB occupied subcarriers in frequency.

In further example embodiments, the respective UE assumes all VLP SSBs in the burst are QCL with Type A and D.

Additionally, in one embodiment, VLP SRS transmissions during (OFF time in mode #2 or duration D2) are based on applying the Srs-powerbackoff indicated in DutyCycleMode-r18 to all configured SRS resources in the active UL BWP. Note that the number of configured SRS resources can be reduced by the network (if desired) during the ON state (duration D1). Rel-16 supports up to 12 SRS symbols per slot per UE, and existing higher-layer signaling can enable this for VLP SRS coverage enhancement.

In yet further example embodiments, the UEs assume that the PathlossReferenceRS-Config configured for UL SRS power adjustments based on DL path loss estimates applies to ON state DL RS only.

Figure 12:
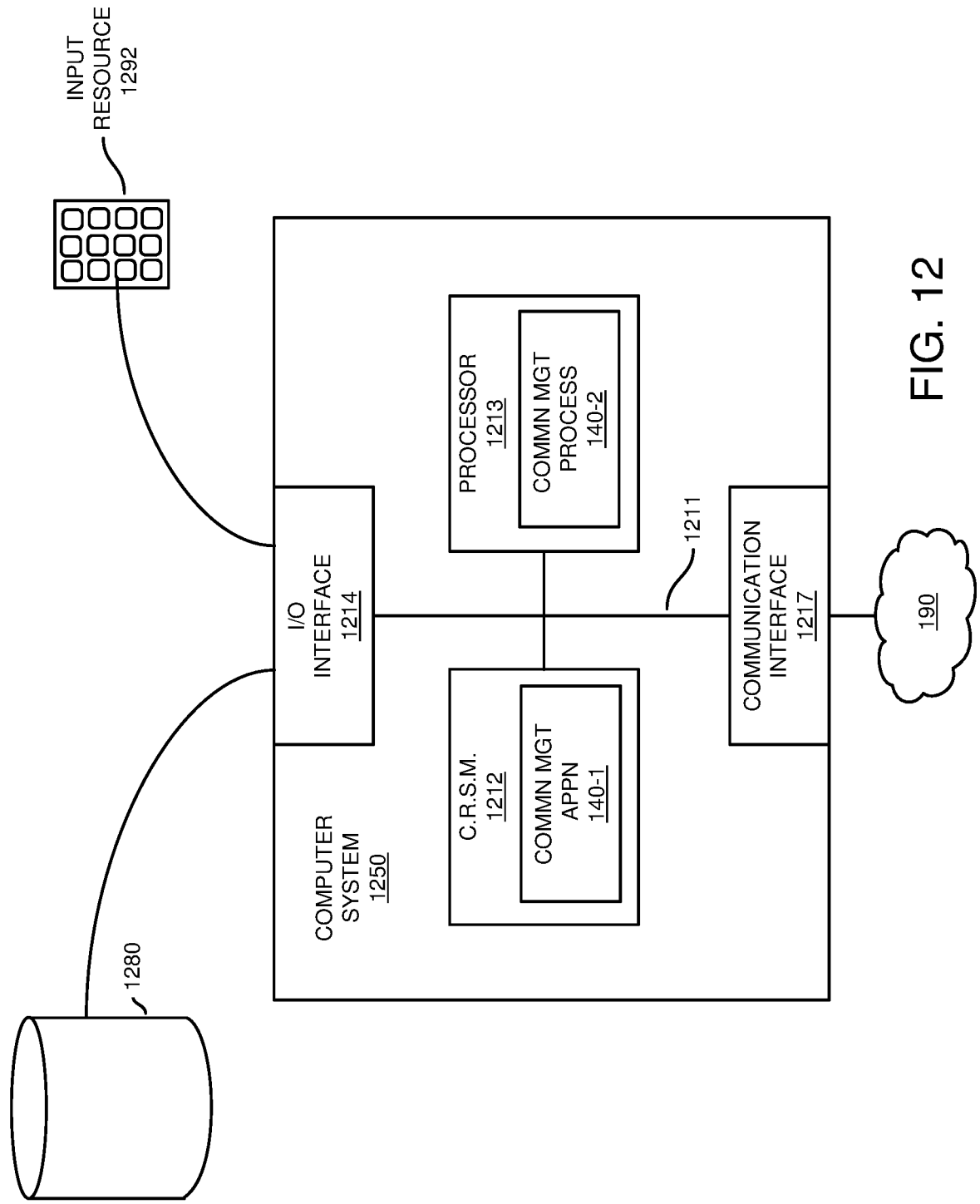
FIG. 12 is an example diagram illustrating example computer architecture operable to execute one or more operations according to embodiments herein.

FIG. 12 is an example block diagram of a computer system for implementing any of the operations as previously discussed according to embodiments herein.

Any of the resources (such as bandwidth monitor 130, spectrum allocation management resource 140, wireless base station 131, wireless base station 132, communication device CD11, communication device CD12, etc.) as discussed herein can be configured to include computer processor hardware and/or corresponding executable instructions to carry out the different operations as discussed herein.

As shown, computer system 1250 of the present example includes interconnect 1211 coupling computer readable storage media 1212 such as a non-transitory type of media (which can be any suitable type of hardware storage medium in which digital information can be stored and or retrieved), a processor 1213 (computer processor hardware), I/O interface 1214, and a communications interface 1217.

I/O interface(s) 1214 supports connectivity to repository 1280 and input resource 1292.

Computer readable storage medium 1212 can be any hardware storage device such as memory, optical storage, hard drive, floppy disk, etc. In one embodiment, the computer readable storage medium 1212 stores instructions and/or data.

As shown, computer readable storage media 1212 can be encoded with communication management application 140-1 (e.g., including instructions) in a respective wireless station to carry out any of the operations as discussed herein.

During operation of one embodiment, processor 1213 accesses computer readable storage media 1212 via the use of interconnect 1211 in order to launch, run, execute, interpret or otherwise perform the instructions in communication management application 140-1 stored on computer readable storage medium 1212. Execution of the communication management application 140-1 produces communication management process 140 2 to carry out any of the operations and/or processes as discussed herein.

Those skilled in the art will understand that the computer system 1250 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1250 may reside at any location or can be included in any suitable resource in any network environment to implement functionality as discussed herein.

Functionality supported by the different resources will now be discussed via flowcharts in FIG. 13. Note that the steps in the flowcharts below can be executed in any suitable order.

Figure 13:
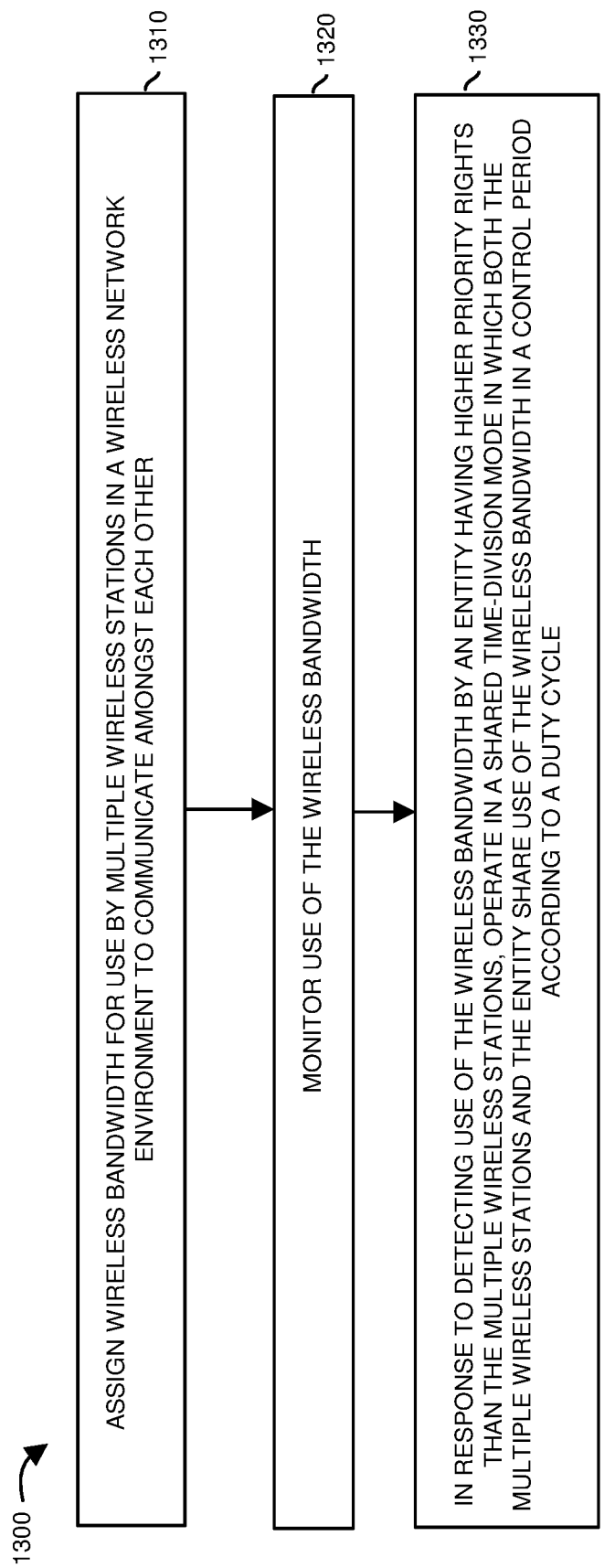
FIG. 13 is an example diagram illustrating methods according to embodiments herein.

FIG. 13 is a flowchart 1300 illustrating an example method according to embodiments herein. Note that there will be some overlap with respect to concepts as discussed above.

In processing operation 1310, the spectrum allocation management resource 140 assigns wireless bandwidth for use by multiple wireless stations in a wireless network environment 100 to communicate amongst each other.

In processing operation 1320, the spectrum allocation management resource 140 monitors use of the available wireless bandwidth.

In processing operation 1330, in response to detecting use of the wireless bandwidth by an entity (such as a higher priority entity operating RADAR system 150) having higher priority rights than the multiple wireless stations, the spectrum allocation management resource 140 operates in a shared time-division mode in which both the multiple wireless stations and the entity share use of the wireless bandwidth in a respective control period according to a duty cycle.

Note again that techniques herein are well suited to facilitate use of a shared wireless channel amongst different types of wireless stations. However, it should be noted that embodiments herein are not limited to use in such applications and that the techniques discussed herein are well suited for other applications as well. Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
    assigning wireless bandwidth for use by multiple wireless stations in a wireless network environment to communicate amongst each other;
    monitoring use of the wireless bandwidth; and
    in response to detecting use of the wireless bandwidth by an entity having higher priority rights than the multiple wireless stations, operating in a shared mode in which both the multiple wireless stations and the entity share use of the wireless bandwidth in a control period according to a duty cycle.

2. The method as in claim 1, wherein the entity having the higher priority rights than the multiple wireless stations uses the wireless bandwidth during an entirety of the control period; and
wherein the multiple wireless stations are allocated use of the wireless bandwidth for a less-than-all portion of the control period in accordance with the duty cycle.

3. The method as in claim 2, wherein operating in the shared mode includes, in accordance with the duty cycle, varying usage of the wireless bandwidth by the multiple wireless stations during the control period.

4. The method as in claim 1, wherein detecting use of the wireless bandwidth includes: detecting implementation of RADAR (RAdio Detection And Ranging) by the entity in a vicinity of the multiple wireless stations.

5. The method as in claim 1, wherein the control period includes a first portion and a second portion, the first portion of the control period allocated for use by the multiple wireless stations to communicate amongst each other via the wireless bandwidth, the second portion of the control period allocated for use by the entity to use the wireless bandwidth in a region in which the multiple wireless stations reside.

6. The method as in claim 5 further comprising:
in the first portion of the control period, limiting use of the wireless bandwidth by the multiple wireless stations during time slots in which the entity is scheduled to transmit wireless signals using the wireless bandwidth.

7. The method as in claim 5, wherein the multiple wireless stations, in order to maintain wireless connectivity, communicate amongst each other at reduced wireless power levels during the second portion of the control period with respect to wireless power levels implemented by the multiple wireless stations to communicate in the first portion of the control period.

8. The method as in claim 1, wherein operating in the shared mode includes:
allocating a portion of the control period and corresponding use of the wireless bandwidth by the multiple wireless stations depending on a direction of the entity transmitting wireless signals using the wireless bandwidth.

9. The method as in claim 1, wherein operating in the shared mode includes: notifying a first wireless station of the multiple wireless stations of a portion of the control period assigned for use by the first wireless station.

10. The method as in claim 1, wherein the multiple wireless stations include a wireless base station and a mobile communication device; and
wherein operating in the shared mode includes: transmitting a first notification from the wireless base station to the mobile communication device, the first notification indicating a power level at which the wireless base station is configured to wirelessly transmit first wireless communications during a less-than-all portion of the control period.

11. The method as in claim 10, wherein operating in the shared mode further includes: transmitting a second notification from the wireless base station to the mobile communication device, the second notification controlling a power level at which the mobile communication device is configured to wirelessly transmit wireless communications to the wireless base station during the less-than-all portion of the control period.

12. The method as in claim 1 further comprising:
in response to switching from a first mode in which each of the multiple wireless stations is assigned use of the wireless bandwidth to the shared mode in which both the multiple wireless stations and the entity share use of the wireless bandwidth, adjusting a repetition gain of communicating from a first wireless station of the multiple wireless stations to a second wireless station of the multiple wireless stations.

13. The method as in claim 1 further comprising:
in response to switching from a first mode of the multiple wireless stations being assigned use of the wireless bandwidth to the shared mode, reducing a rate of transmitting a wireless reference signal from a first wireless station of the multiple wireless stations.

14. The method as in claim 1, wherein the duty cycle varies over time.

15. The method as in claim 1, wherein the duty cycle of the control period depends on a direction of wireless communications transmitted by the entity having higher priority rights than the multiple wireless stations.

16. The method as in claim 15, wherein the multiple wireless stations are granted use of the wireless bandwidth during a first time duration portion of the control period in which the entity transmits over the wireless bandwidth in a first direction away from the multiple wireless stations.

17. The method as in claim 16, wherein the multiple wireless stations are restricted from using the wireless bandwidth during a second time duration portion of the control period in which the entity transmits over the wireless bandwidth in a second direction towards the multiple wireless stations.

18. The method as in claim 1, wherein a time duration of the control period depends on an amount of time associated with the entity completing a 360 degree rotation of the entity transmitting wireless communications.

19. The method as in claim 1, wherein the duty cycle depends on a likelihood of the multiple wireless stations wirelessly interfering with the entity.

20. The method as in claim 1 further comprising:
communicating a message to the multiple wireless stations, the message indicating the control period and the duty cycle to implement during the shared mode in which both the multiple wireless stations and the entity share use of the wireless bandwidth.

21. The method as in claim 20, wherein the duty cycle indicates a split of the control period into a first time duration and a second time duration associated with the shared mode.

22. The method as in claim 21, wherein the message to the multiple wireless stations indicates: i) that the multiple wireless stations are able to wirelessly transmit at a first wireless power level during the first time duration, and ii) that the multiple wireless stations are limited to wirelessly transmit at a second wireless power level during the second time duration; and
wherein the second power level is lower than the first power level.

23. The method as in claim 1 further comprising:
prior to operating in the shared mode, operating in a standard mode in which the multiple wireless stations use the wireless bandwidth without regard to the entity having higher priority rights than the multiple wireless stations.

24. The method as in claim 1, wherein operating in the shared mode includes notifying the multiple wireless stations of a first time duration of the control period in which the wireless bandwidth is allocated for use by the multiple wireless stations and a second time duration of the control period in which the wireless bandwidth is allocated for use by the entity having higher priority rights than the multiple wireless stations.

25. A system comprising:
communication management hardware operative to:
assign wireless bandwidth for use by multiple wireless stations in a wireless network environment to communicate amongst each other;
monitor use of the wireless bandwidth; and
in response to detecting use of the wireless bandwidth by an entity having higher priority rights than the multiple wireless stations, operating in a shared mode in which both the multiple wireless stations and the entity share use of the wireless bandwidth in a control period according to a duty cycle.

26. The system as in claim 25, wherein the entity having the higher priority rights than the multiple wireless stations uses the wireless bandwidth during an entirety of the control period; and
wherein the multiple wireless stations are allocated use of the wireless bandwidth for a less-than-all portion of the control period.

27. The system as in claim 26, wherein the communication management hardware is further operative to:
vary usage of the wireless bandwidth by the multiple wireless stations during the control period.

28. The system as in claim 26, wherein the communication management hardware is further operative to:
detect implementation of RADAR (RAdio Detection And Ranging) by the entity in a vicinity of the multiple wireless stations.

29. The system as in claim 25, wherein the control period includes a first portion and a second portion, the first portion of the control period allocated for use by the multiple wireless stations to communicate amongst each other via the wireless bandwidth, the second portion of the control period allocated for use by the entity to use the wireless bandwidth in a region in which the multiple wireless stations reside.

30. The system as in claim 29, wherein the communication management hardware is further operative to:
in the first portion of the control period, limit use of the wireless bandwidth by the multiple wireless stations during time slots in which the entity is scheduled to transmit wireless signals using the wireless bandwidth.

31. The system as in claim 29, wherein the multiple wireless stations, in order to maintain wireless connectivity, communicate amongst each other at reduced wireless power levels during the second portion of the control period with respect to wireless power levels implemented by the multiple wireless stations in the first portion of the control period.

32. The system as in claim 25, wherein the communication management hardware is further operative to:
allocate a portion of the control period and corresponding use of the wireless bandwidth by the multiple wireless stations depending on a direction of the entity transmitting wireless signals using the wireless bandwidth.

33. The system as in claim 25, wherein the communication management hardware is further operative to:
notifying a first wireless station of the multiple wireless stations of a portion of the control period assigned for use by the first wireless station.

34. The system as in claim 25, wherein the multiple wireless stations include a wireless base station and a mobile communication device; and
wherein the communication management hardware is further operative to: transmit a first notification from the wireless base station to the mobile communication device, the first notification indicating a power level at which the wireless base station is configured to wirelessly transmit first wireless communications during a less-than-all portion of the control period.

35. The system as in claim 34, wherein the communication management hardware is further operative to: transmit a second notification from the wireless base station to the mobile communication device, the second notification controlling a power level at which the mobile communication device is configured to wirelessly transmit wireless communications to the wireless base station during the less-than-all portion of the control period.

36. The system as in claim 25, wherein the communication management hardware is further operative to:
in response to switching from a first mode in which each of the multiple wireless stations is assigned use of the wireless bandwidth to the shared mode in which both the multiple wireless stations and the entity share use of the wireless bandwidth, adjust a repetition gain of communicating from a first wireless station of the multiple wireless stations to a second wireless station of the multiple wireless stations.

37. The system as in claim 25, wherein the communication management hardware is further operative to:
in response to switching from a first mode of the multiple wireless stations being assigned use of the wireless bandwidth to the shared mode, reduce a rate of transmitting a wireless reference signal from a first wireless station of the multiple wireless stations.

38. The system as in claim 25, wherein the duty cycle varies over time.

39. Computer-readable storage hardware having instructions stored thereon, the instructions, when carried out by computer processor hardware, cause the computer processor hardware to:
assign wireless bandwidth for use by multiple wireless stations in a wireless network environment to communicate amongst each other;
monitor use of the wireless bandwidth; and
in response to detecting use of the wireless bandwidth by an entity having higher priority rights than the multiple wireless stations, operate in a shared mode in which the multiple wireless stations and the entity share use of the wireless bandwidth in a control period according to a duty cycle.

* * * * *